Figure 1:
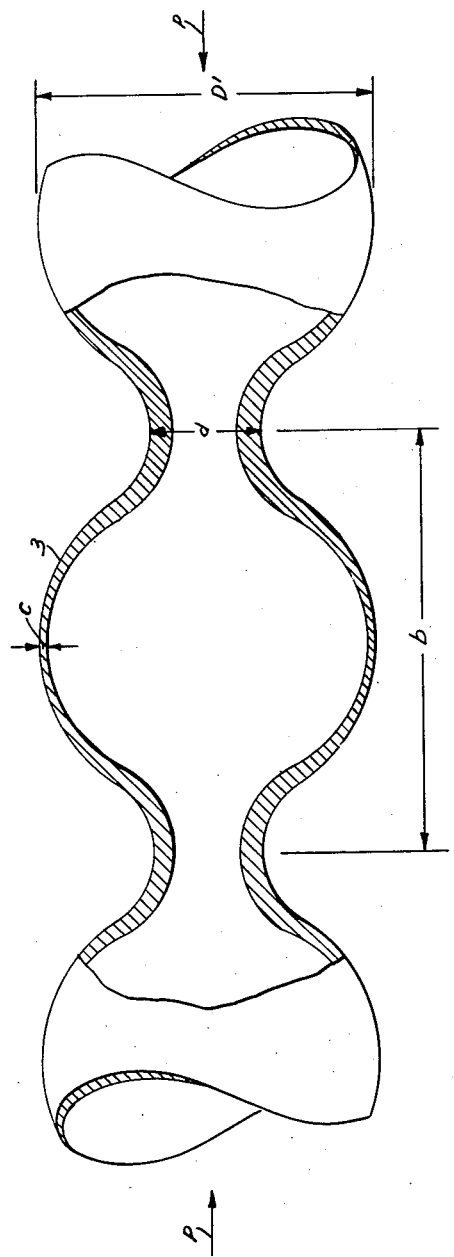

July 16, 1957 H. DEBOR 2,799,084
PROCESS FOR THE MANUFACTURE OF CONTAINERS OF THE BULB
AND NECK TYPE FOR STORING GASES UNDER HIGH PRESSURE
Filed April 6, 1953

INVENTOR.
Hermann Debor
BY
Michael S. Striker
Agent

United States Patent Office 2,799,084
Patented July 16, 1957

2,799,084

PROCESS FOR THE MANUFACTURE OF CONTAINERS OF THE BULB AND NECK TYPE FOR STORING GASES UNDER HIGH PRESSURE

Hermann Debor, Munich, Germany, assignor to Mannesmann Aktiengesellschaft, Dusseldorf, Germany, a German company Application April 6, 1953, Serial No. 347,157

Claims priority, application Germany April 15, 1952

1 Claim. (Cl. 29—421)

This invention relates to a process for the manufacture of steel containers of the bulb and neck type for storing gases under high pressure.

Many proposals have been made for the manufacture from tubes of bulb and neck flasks for storing gases under high pressure, for example, by the employment as the initial workpiece of a tube having a diameter corresponding to the largest bulb diameter, the constrictions being produced by radial reduction.

It has also been proposed to use as the initial workpiece a tube having a diameter corresponding to the constriction between the bulbs. The tube is heated and expanded to the bulb diameter by inflation with gas under pressure and, in order to avoid weakening of the wall thickness to too great an extent, the tube is compressed axially during the inflation, the axial compression being performed in a separate working operation before the inflation. The thickness of the wall may be strengthened and shaped at the constrictions by special tools, and the initial workpiece may be of a diameter which is between that of the constrictions and that of the largest portion of the bulb, the constrictions being produced by a reducing operation which is followed by the inflation of the bulbs.

It has been possible with some of these manufacturing processes which have been described to produce serviceable bulb and neck flasks, but the flasks produced thereby do not have the lowest possible weight, because it was not possible to obtain the uniformity of wall thickness which is actually required. The wall thickness at some points was either too thin, so that a greater overall wass thickness was necessary in order to satisfy safety requirements, or thicker than necessary, so that it was not possible to maintain the lowest possible weight.

Figure 2:
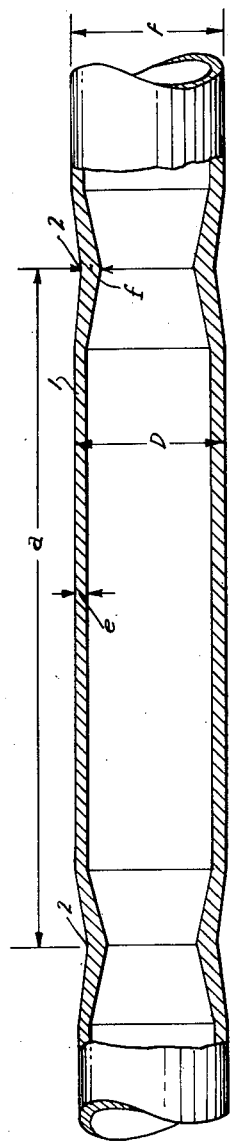

The present invention overcomes these difficulties and outlines a manufacturing process with which it is possible to produce a bulb and neck flask which conforms to the wall thickness ratios necessary at all positions of such flasks or at least substantially to conform to such ratios. The object of the present invention is carried into effect by the combination of a number of steps, each of which independently has a desirable effect in relation to the thickness ratios of the wall in the finished bulb and neck flask. The essentially greater wall thickness in the intermediate neck-shaped sections is mainly dependent on the dimensions of the constriction, that is to say, on the choice of the original tube diameter. Moreover, the thickness of the wall of the flask, particularly in the region of the zenith of the bulb, is substantially determined by the original tube diameter, since the extent of the expansions during the inflation is dependent on such diameter. The wall thickness in the transition zones between spherical and neck-shaped portions is mainly determined by the extent of the axial compression during the inflation. It is obvious that also the selection of the wall thickness of the initial tube is important in connection with all variations in wall thickness produced by the separate steps. If the ratios of the thickness of the wall are known for the bulb and neck flasks which are to be manufactured, for example, are calculated in accordance with the features of a known formula, the dimensions of the initial tubes necessary for the manufacture of these flasks can be determined without difficulty by a few tests. The method of the invention will be best understood with reference to the drawing, in which:

Fig. 1 is an axial sectional view of a bulb and neck container made in accordance with the present invention; and Fig. 2 is a sectional view of the workpiece in an intermediate state during manufacture.

According to the present invention, the process of manufacture of bulb and neck flasks comprises three steps, namely:

(a) As shown in Fig. 2, an initial tube with a diameter D which is approximately ⅕ to ⅓ greater than the diameter d of the constricted portions and about half as large as the largest bulb diameter D', and of a length which corresponds approximately to 1.3 to 1.8 times the length of the finished bulb and neck flask, is reduced by rolling at the places 2 for forming neck-shaped intermediate portions having the desired constriction diameter d, with increases in the wall thickness from e to f. Thus, the diameter of the constricted portions is approximately between five sixths and three quarters of the starting diameter of the tube and the maximum diameter of the bulb portions is approximately twice the starting diameter of the tube, while the final length of the tube is approximately between five ninths and ten thirteenths of the starting length of the tube.

(b) The initial workpiece reduced at the constriction points 2, as shown in Fig. 2 is heated up to a temperature at which it may be shaped in a hot condition and is inflated in a die by means of gases under pressure to form, as shown in Fig. 1, separate bulbs 3 between the constricted portions 2, with decrease in the wall thickness from e to c.

(c) The workpiece is subjected, during the inflation, to a compression in the direction of its longitudinal axis by forces acting in direction of the arrows P. Thereby, the distance between constricted portions is reduced from a distance $a$ to a distance $b$.

By way of example, there are hereafter described the ratios for a gas flask with a content of 40 litres: The flask has a total length of 1430 mm and is formed of five bulbs which have a maximum diameter of 260 mm. and are connected with one another by neck-shaped intermediate portions with an external diameter of 100 mm. In order to manufacture this flask, an initial tube is employed of which the external diameter is 127 mm. and of which the length is of 2150 mm.

What I claim as my invention and desire to secure by Letters Patent of the United States is:

A process for the manufacture of bulb and neck flasks for storing gases under high pressure comprising, in combination, the steps of rolling a tube having a predetermined diameter, a predetermined initial length and a predetermined wall thickness at axially spaced points so as to produce axially spaced tube neck portions having a diameter being approximately between five-sixths and three-quarters of said predetermined diameter, and having a greater wall thickness than said predetermined wall thickness; heating the thus shaped tube to a temperature at which it is in condition for expanding and shaping; inflating said tube in a die means to form bulging tube portions intermediate said neck portions, the maximum diameters of said bulging bulb portions being approximately twice said predetermined diameter; and compressing said tube in axial direction while it is being inflated in hot condition to reduce the length of said tube to a shorter length being approximately between five ninths and ten thirteenths of the predetermined initial length of said tube so as to increase the wall thickness of said bulging portions.

References Cited in the file of this patent

UNITED STATES PATENTS

| | | |
|---|---|---|
| 267,962 | Wright et al. | Nov. 21, 1882 |
| 1,676,795 | Mailey et al. | July 10, 1928 |
| 1,948,560 | Borneman | Feb. 27, 1934 |
| 2,106,495 | Debor | Jan. 25, 1938 |
| 2,106,496 | Debor | Jan. 25, 1938 |
| 2,222,762 | Debor | Nov. 26, 1940 |
| 2,470,923 | Eisler | May 24, 1949 |

OTHER REFERENCES

Procedures in Experimental Physics, Strong et al., published by Prentice-Hall, Inc., New York, 1944; pages 21 and 22.